(12) United States Patent
Unger et al.

(10) Patent No.: US 7,004,537 B2
(45) Date of Patent: Feb. 28, 2006

(54) MOLDING APPARATUS FOR VEHICLES AND METHODS FOR USE

(75) Inventors: Joseph T. Unger, Corona, CA (US); Darrell L. Breckel, Corona, CA (US); Stephen Samuel, San Jose, CA (US); Steve Brook, Auburn Hills, MI (US)

(73) Assignee: Sport Carriers, Inc., Medford, OR (US)

( * ) Notice: Subject to any disclaimer, the term of this patent is extended or adjusted under 35 U.S.C. 154(b) by 0 days.

(21) Appl. No.: 10/789,284

(22) Filed: Feb. 27, 2004

(65) Prior Publication Data
US 2005/0189792 A1 Sep. 1, 2005

(51) Int. Cl.
B60J 7/00 (2006.01)

(52) U.S. Cl. ...................................... 296/210
(58) Field of Classification Search .................. 296/41, 296/93, 187.12, 203.03, 207, 209, 210
See application file for complete search history.

(56) References Cited

U.S. PATENT DOCUMENTS

| 4,092,766 | A | 6/1978 | Meyer |
| 4,108,342 | A | 8/1978 | Riva |
| 4,684,048 | A | 8/1987 | Bott |
| 4,723,696 | A | 2/1988 | Stichweh et al. |
| 4,754,905 | A | 7/1988 | Bott |
| 4,877,168 | A | 10/1989 | Bott |
| 4,967,945 | A | 11/1990 | Bott |
| 5,013,083 | A | 5/1991 | Yada et al. |
| 5,133,490 | A | 7/1992 | Cucheran |
| 5,222,336 | A | 6/1993 | Yada et al. |
| 5,413,398 | A | 5/1995 | Kim |
| 5,476,201 | A | 12/1995 | Hall et al. |
| 5,615,818 | A | 4/1997 | Linden |
| 5,765,737 | A | 6/1998 | Cucheran et al. |
| 5,782,392 | A | 7/1998 | Yamamoto |
| 6,210,615 | B1 | 4/2001 | Yoshizuru et al. |
| 6,224,145 | B1 | 5/2001 | Sugiura |
| 6,250,528 | B1 | 6/2001 | Lumpe et al. |
| 6,311,882 | B1 | 11/2001 | Allison et al. |
| 6,510,602 | B1 | 1/2003 | Sugiura |
| 6,557,931 | B1 | 5/2003 | Tremmel et al. |
| 6,568,748 | B1 * | 5/2003 | Yoon .......................... 296/210 |
| 6,695,397 | B1 * | 2/2004 | Kamiya et al. ............. 296/210 |

(Continued)

FOREIGN PATENT DOCUMENTS

DE 3637856 A1 11/1986

(Continued)

OTHER PUBLICATIONS

Luggage Carrier, R-100-135, General Motors Corporation Master Process Plan, Nov. 7, 2002, p. 4 of 5.

(Continued)

Primary Examiner—Lori L. Coletta
(74) Attorney, Agent, or Firm—Cohen Sakaguchi & English LLP

(57) ABSTRACT

A molding apparatus and method for use are provided for covering a seam extending between roof and side panels of a vehicle, the panels including opposing shoulders adjacent the seam defining a ditch. The apparatus includes a section of molding including first and second ends, an upper surface including a painted finish, and a lower surface. Mounts extend from the lower surface that are spaced apart from one another. Flexible trim extends along side edges of the molding between the first and second ends. In addition, a roof rack member extends from the upper surface of the molding. During use, the molding is mounted to the vehicle at a plurality of discrete locations, e.g., by the mounts, such that the molding extends along the ditch without touching the shoulders. The trim extends from the side edges to contact the shoulders of the ditch.

22 Claims, 9 Drawing Sheets

U.S. PATENT DOCUMENTS

2002/0180246 A1 * 12/2002 Nagashima et al. ........ 296/210
2003/0111869 A1    6/2003 Kamiya et al.

FOREIGN PATENT DOCUMENTS

| DE | 19745757 | 10/1997 |
|---|---|---|
| EP | 0827870 | 11/1998 |
| JP | 8040153 | 2/1996 |
| JP | 1059086 | 3/1998 |
| JP | 10109600 | 4/1998 |
| JP | 10217871 | 8/1998 |
| JP | 10324199 | 12/1998 |
| JP | 11059286 | 3/1999 |
| JP | 11139220 | 5/1999 |
| JP | 2001/315589 | 11/2001 |
| JP | 2002/046548 | 2/2002 |

OTHER PUBLICATIONS

Digital Photographs of SAAB Molding, 3 pages.

* cited by examiner

MOLDING APPARATUS FOR VEHICLES AND METHODS FOR USE

FIELD OF INVENTION

The present invention relates generally to components of automobiles and other vehicles, and, more particularly, to molding and related components that may be installed to cover seams between adjacent panels of a vehicle, such as a roof ditch between roof and side panels of a vehicle, and methods for installing or using such molding.

BACKGROUND

Vehicles, such as cars, trucks, and sport utility vehicles, generally include multiple sheet metal panels mounted to a frame of the vehicle to provide an outer finish for the vehicle. For example, a vehicle may include one or more roof panels and side panels that are mounted to the frame, resulting in one or more seams extending between the panels. Generally, a seam extends between a roof panel and each side panel along the roof of a vehicle from the front windshield to the rear window.

The edges of the adjacent panels may be abutted or overlapped with one another, thereby defining a seam. In some cases, the adjacent panels may include one or more upright flanges, e.g., that may be butted against one another to facilitate joining and/or sealing the panels together. The resulting seam may be joined, e.g., by spot or continuous welding, bonding using an adhesive, and the like, and/or sealed, e.g., using a caulk or other sealant, and the like. The seam may be joined and/or sealed along or between the edges and/or along ends of or between abutted flanges.

Because the resulting seam may be unattractive, molding may be attached over the seam to cover the lapped edges or flanges and/or to provide a desired aesthetic finish. One of the problems with conventional strips of molding is that it may be difficult to apply the molding in a continuous, e.g., straight or curved, line along the seam. When the molding is applied to a seam that is several feet long, any irregularities may be particularly noticeable to observers, such as potential purchasers of the vehicle. In addition, such molding may extend above the surface of the roof, detracting from the continuity and aesthetic appearance of the roofline.

For some panels, grooves or shoulders may be formed along the edges such that the adjacent panels define a channel or "ditch" along the seam. For example, a ditch may be provided along a seam between a roof and side panel for directing water, e.g., rain, along the ditch such that it does not run down on passengers entering or exiting the vehicle.

Because the ditch may include abutted flanges, spot welds, sealants, and/or other non-aesthetic features, molding is generally applied along the seam within the ditch to cover the seam and provide an aesthetic finish. The molding may be applied to the bottom of the ditch, e.g., using an adhesive and/or fasteners, or may extend across the ditch and be connected to the adjacent panels, e.g., by tongues or ribs on the molding that are received under ledges of the ditch. As explained above, such molding, however, may not be easily applied in a continuous uniform line, thereby detracting from the finished appearance of the vehicle. In addition, the surface within the ditch may be irregular due to the welds, sealants, and/or other non-aesthetic features. When the molding is applied in the ditch over such objects, the molding may not lie substantially flat within the ditch, potentially creating an unattractive finish.

Accordingly, molding and/or components for covering a seam between panels of a vehicle would be useful.

SUMMARY OF THE INVENTION

The present invention is directed generally to components for automobiles and other vehicles, and, more particularly, to moldings and related components that may be installed to cover seams between adjacent panels of a vehicle, such as a roof ditch between roof and side panels of a vehicle, and/or to methods for installing and/or using molding.

In one embodiment, an apparatus is provided for covering a seam extending between a first panel and a second panel of a vehicle, the first and second panels including opposing shoulders adjacent the seam defining a ditch having a width and a height. Generally, the apparatus includes an elongate section of molding including first and second ends, an upper surface, and a lower surface. The molding may be substantially rigid and/or may have a shape between the first and second ends contoured to conform substantially to a contour of the first and second panels. Optionally, the upper surface of the molding may include a desired aesthetic finish, e.g., paint.

A plurality of mounts extend from the lower surface that are spaced apart from one another between the first and second ends of the molding. Preferably, each mount has a width less than the width of the ditch such that the mount may be secured in the ditch to the vehicle. Each mount also may include a height such that, when the mounts are secured in the ditch, the molding extends along the ditch without touching the shoulders and/or becoming higher than the first and/or second panels.

In one embodiment, trim may extend along side edges of the molding at least partially between the first and second ends, the flexible trim contacting the shoulders when the mounts are mounted in the ditch. In addition or alternatively, a roof rack member may extend from the upper surface of the molding, e.g., mounted to the molding opposite and/or adjacent the mounts.

In accordance with another embodiment, a method is provided for covering a seam extending between first and second panels of a vehicle, the first and second panels defining a ditch having a width and a height. An elongate section of molding may be provided that includes first and second ends, an upper surface, and a lower surface. The molding may be mounted to the vehicle at a plurality of discrete locations such that the molding extends along the ditch without touching the shoulders.

Optionally, a desired finish may be applied to the upper surface of the molding, e.g., painting the upper surface. A plurality of mounts may be attached to the lower surface of the molding spaced apart from one another between the first and second ends, and the molding may be mounted to the vehicle by securing the plurality of mounts within the ditch. Optionally, a length of trim may be attached along at least one side edge of the molding, the trim contacting the shoulder of the ditch adjacent the one side edge.

In one embodiment, the first panel includes a roof panel, and the second panel includes a side panel, and the ditch extends at least partially between a windshield and a rear window of the vehicle. For example, a ditch may extend along both sides of a roof panel, e.g., along opposite side panels of the vehicle. Sections of molding may be attached to the vehicle or its components at a plurality of discrete locations such that a section of molding extends along each ditch without touching the adjacent side and roof panels.

Optionally, a roof rack member may be provided on each of the sections of molding. In this alternative, one or more crossbars or other carrier accessory may be extended between the roof rack members, e.g., to facilitate carrying cargo on the roof of the vehicle.

Other objects and features of the present invention will become apparent from consideration of the following description taken in conjunction with the accompanying drawings.

DETAILED DESCRIPTION OF THE PREFERRED EMBODIMENTS

Figure 1:
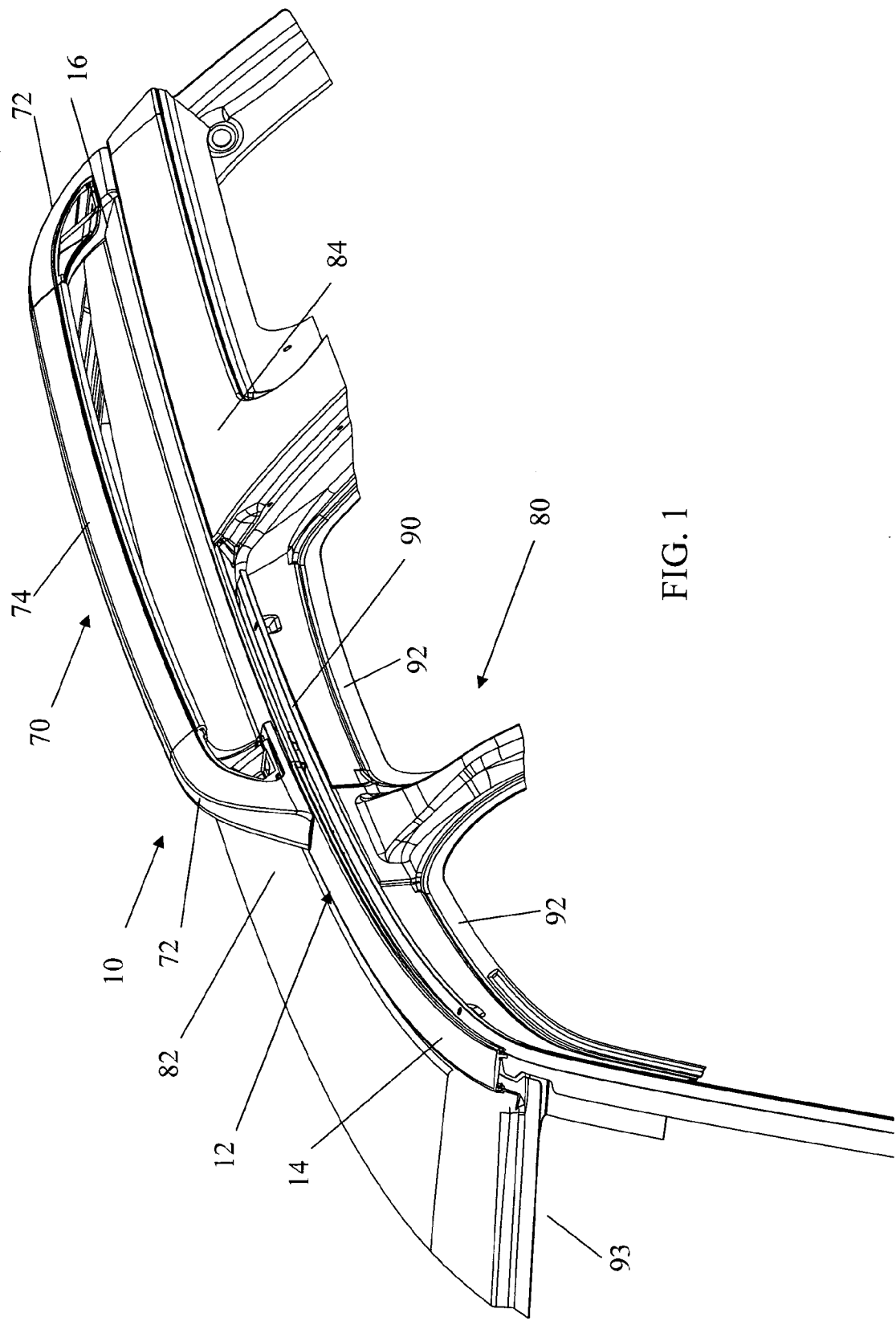
FIG. 1 is a perspective view of a portion of a vehicle, including an exemplary embodiment of roof molding that may be attached to cover a seam between roof and side panels of the vehicle.
Figure 2:
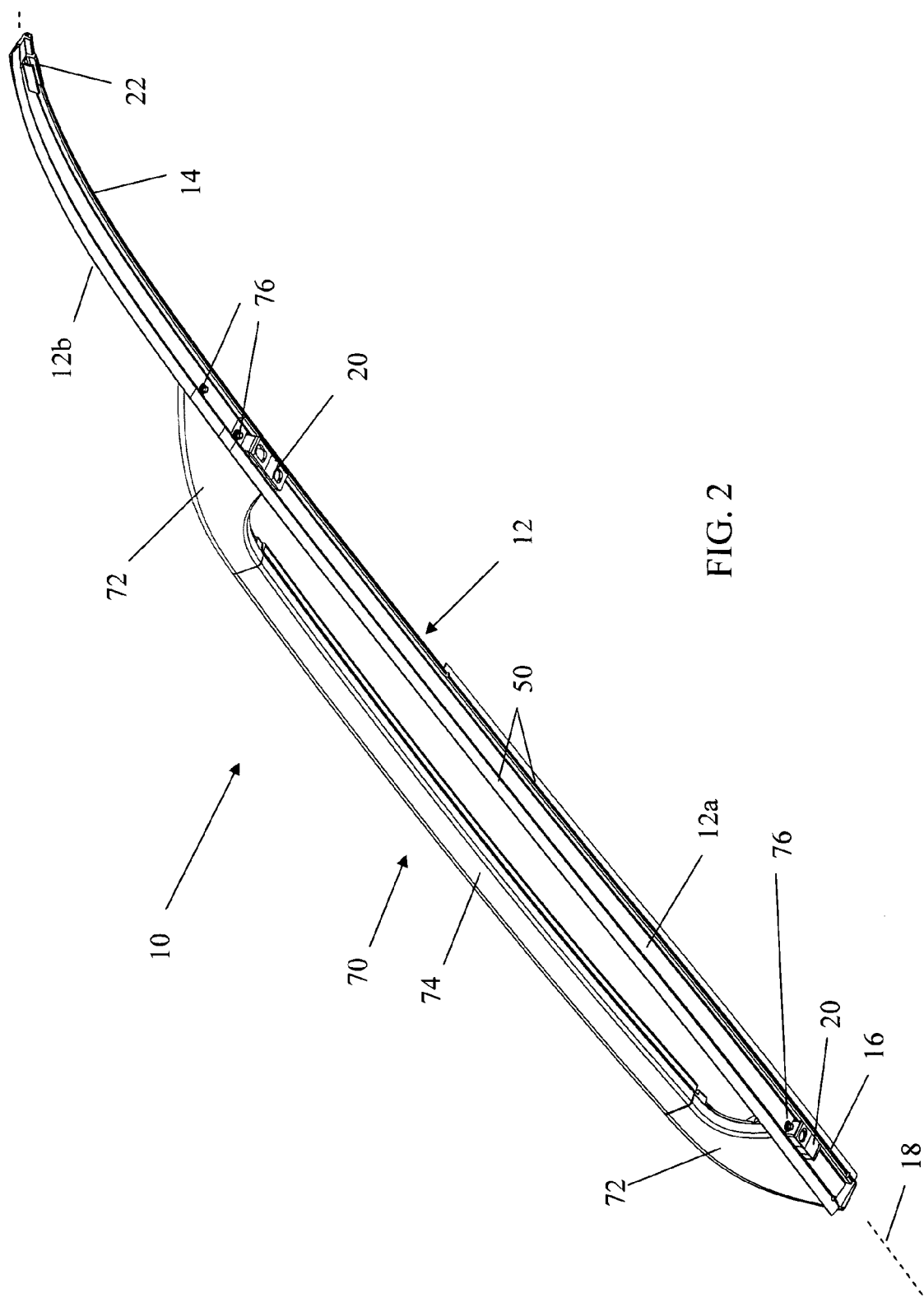
FIG. 2 is a perspective view of the roof molding of FIG. 1.
Figure 3:
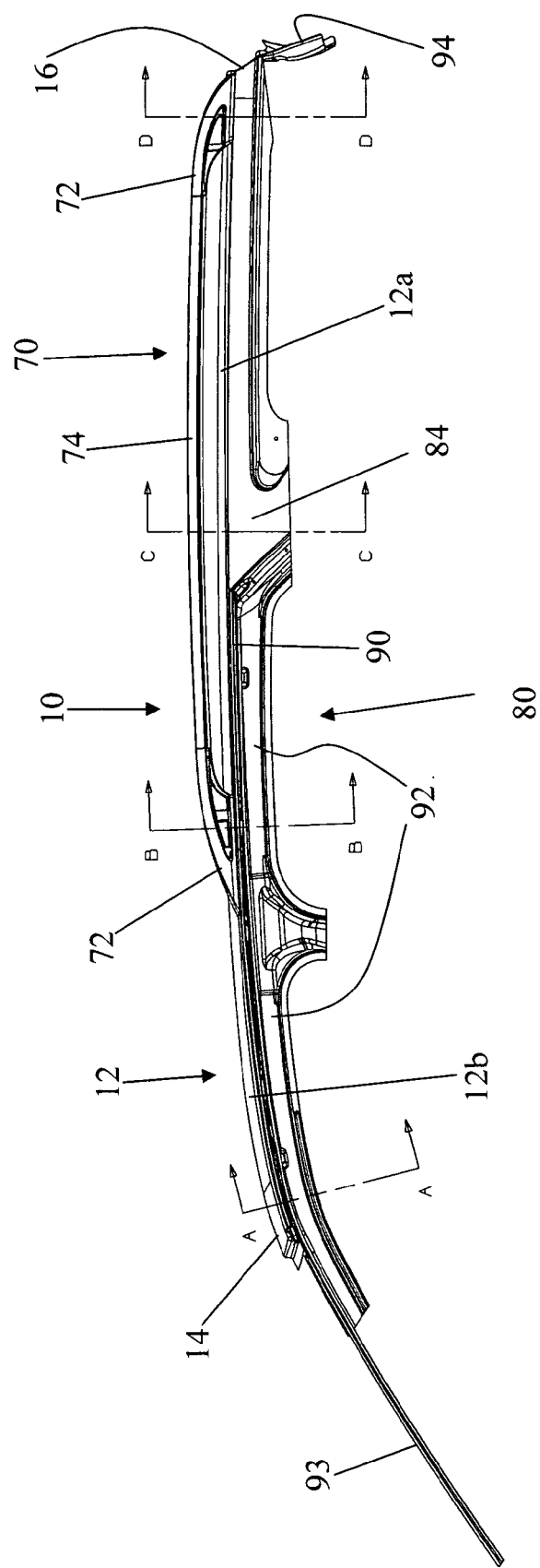
FIG. 3 is a side view of a portion of the vehicle of FIG. 1, showing the roof molding.
Figure 3A:
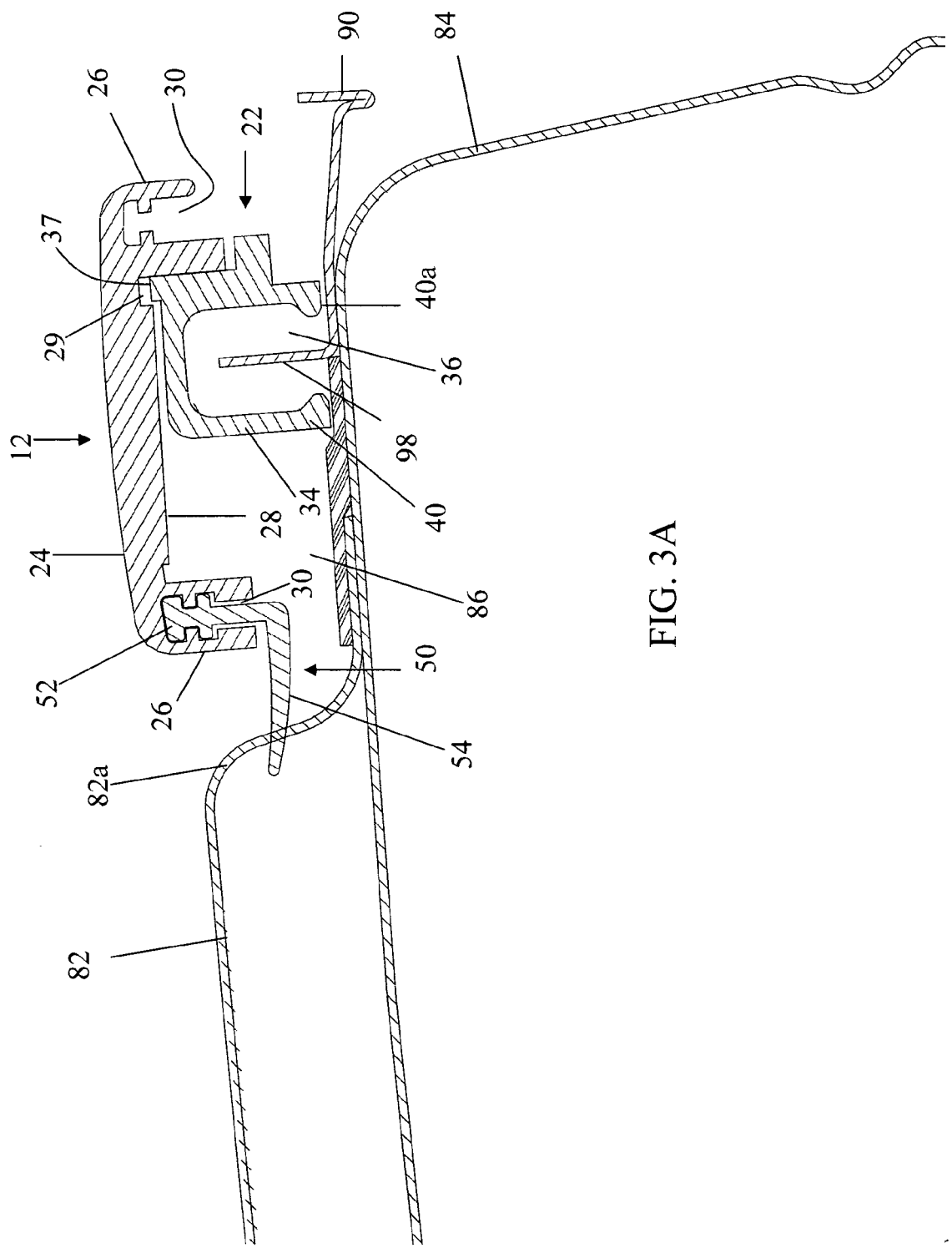
FIGS. 3A–3D are cross-sections of the vehicle of FIG. 3, taken along lines A—A, B—B, C—C, and D—D, respectively.
Figure 3B:
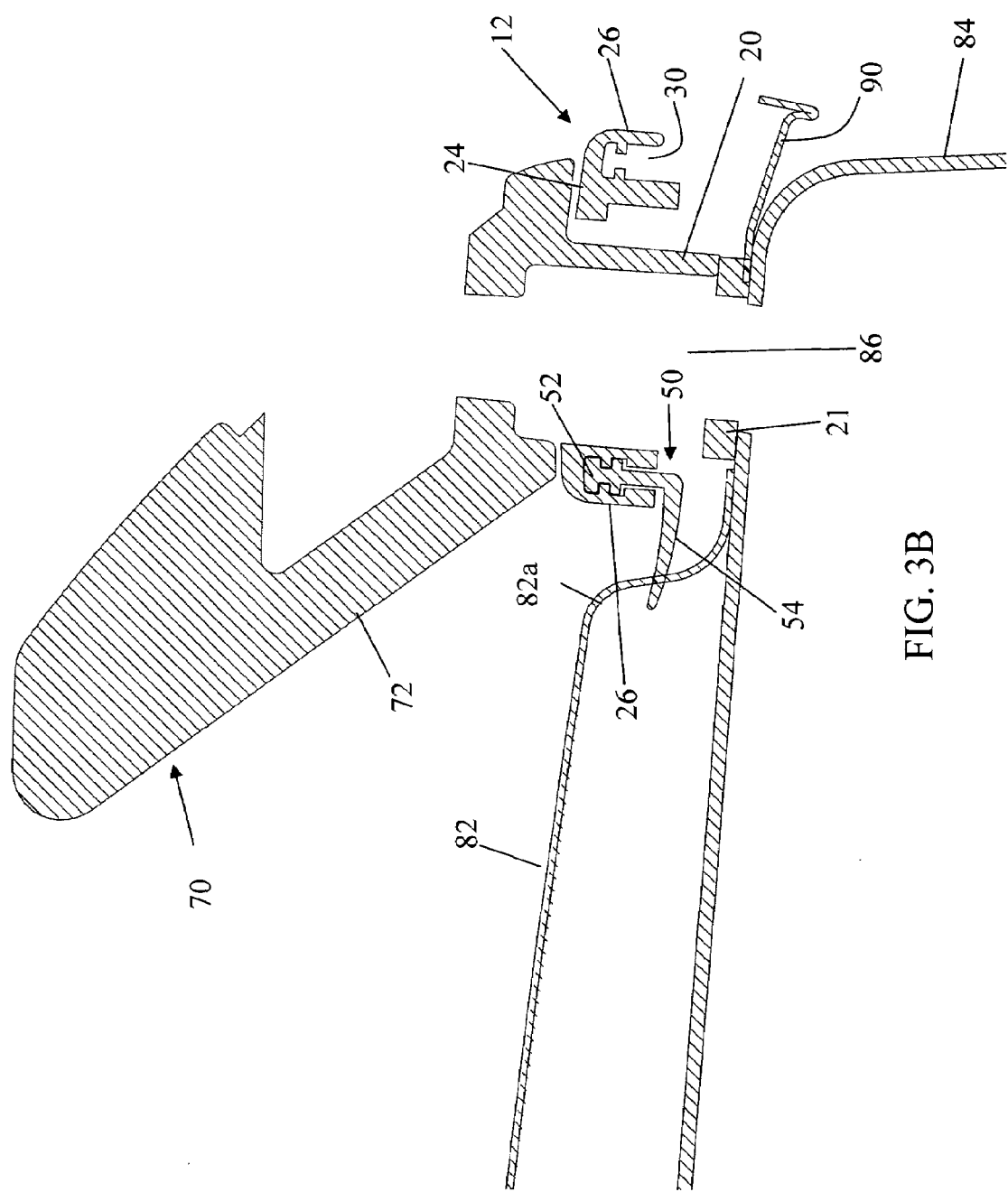
Figure 3C:
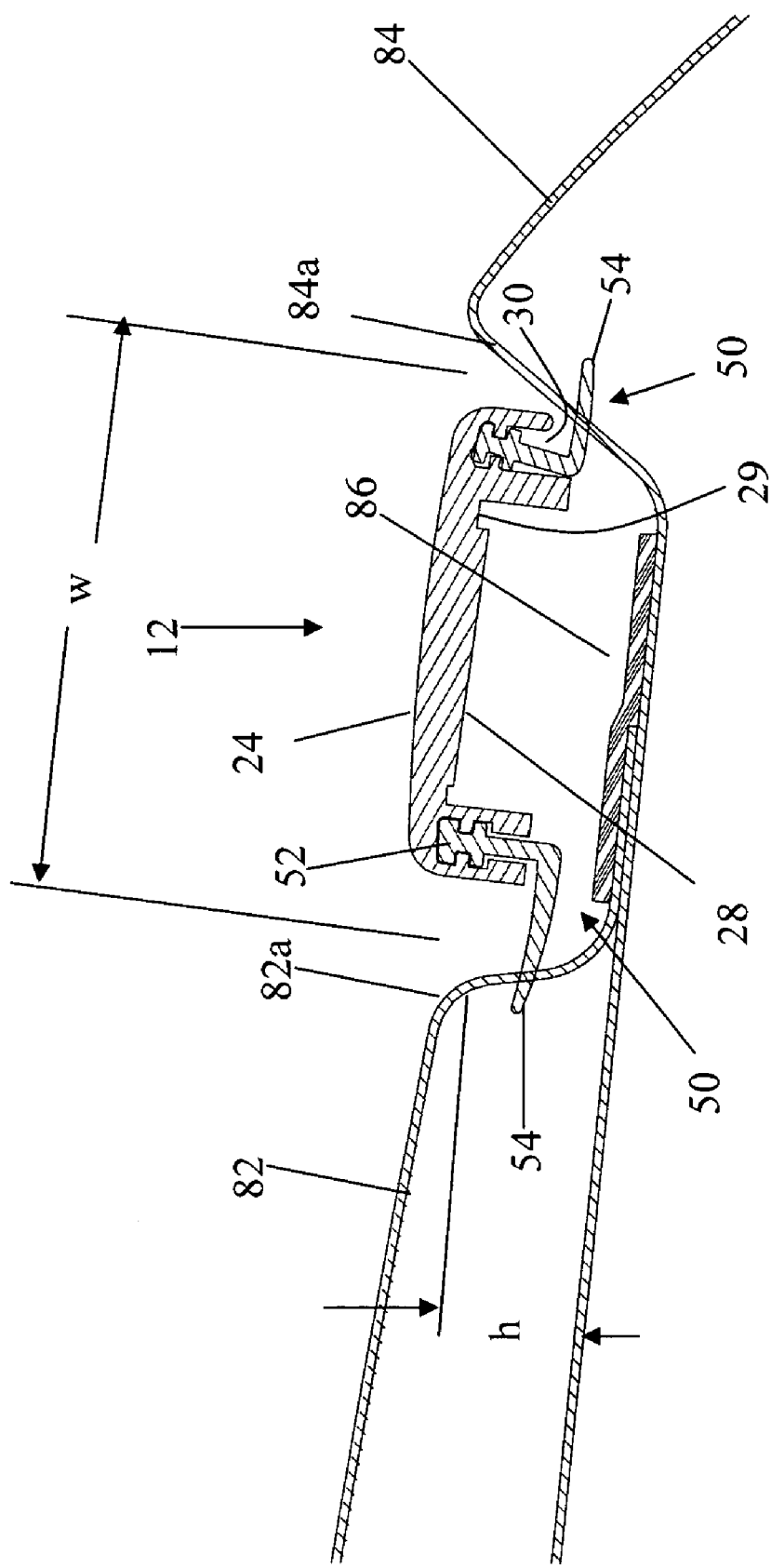
Figure 3D:
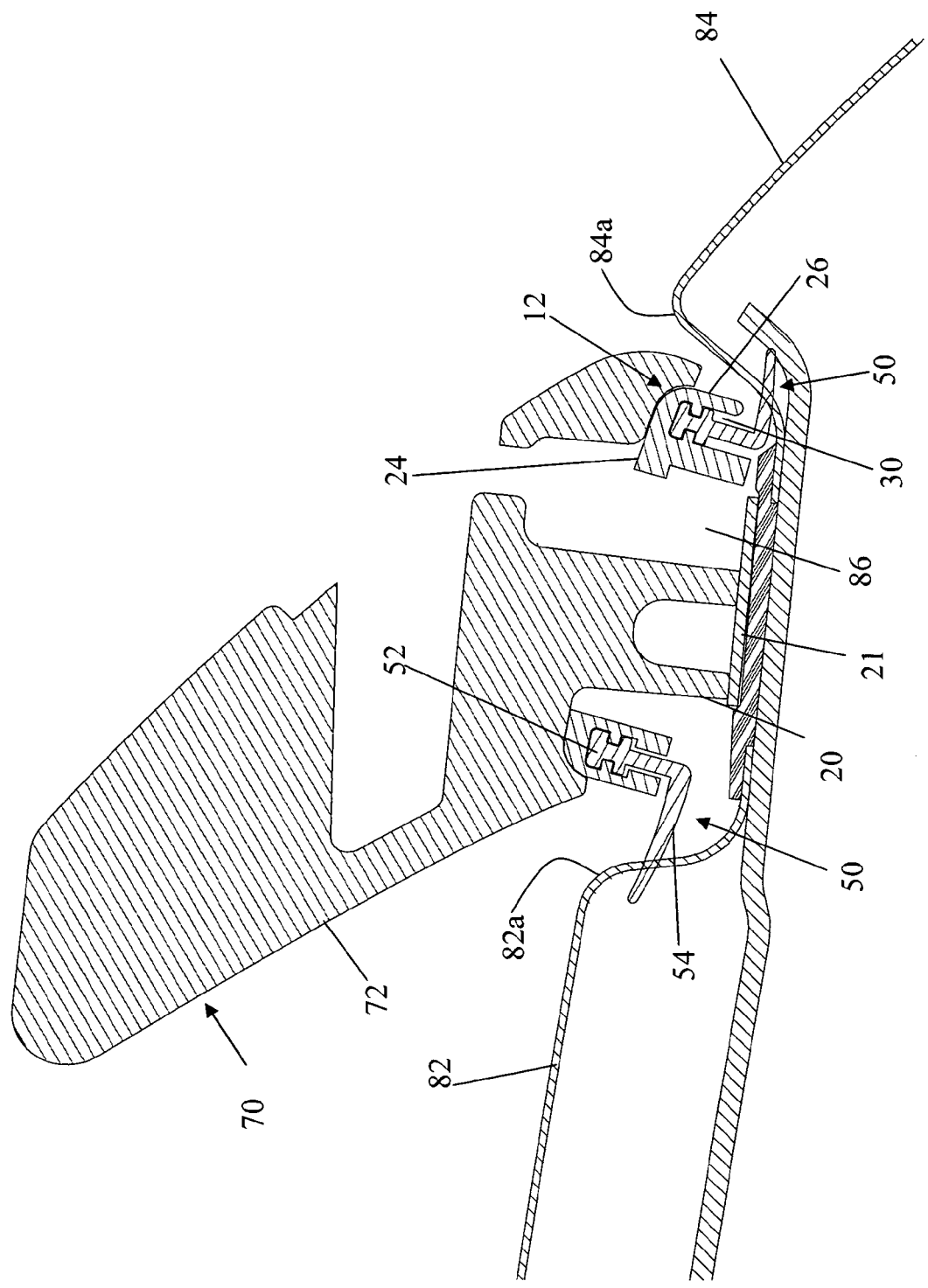

Turning to the drawings, FIGS. 1–3 show an exemplary embodiment of a molding apparatus/roof rack 10 for a vehicle 80, such as a car, truck, sport utility vehicle, or other automobile. As described more particularly below, the apparatus 10 may be used to cover a seam between adjacent panels of the vehicle 80, such as a roof panel 82 and a side panel 84. As shown in FIGS. 3C and 3D, the panels 82, 84 may include opposing shoulders 82a, 84a defining a ditch 86 having a width "w" and a height "h." Optionally, a flange 88 may be provided in the ditch 86, as shown in FIG. 3A, e.g., extending from at least one of the panels 82, 84 and/or from another panel or frame member.

Returning to FIGS. 1–3, the apparatus 10 generally includes an elongate section of molding 12 including first and second ends 14, 16 generally defining a longitudinal axis 18 therebetween, and a plurality of mounts 20, 22 attached to or otherwise extending from the molding 12. Optionally, the apparatus 10 may include a roof rack member 70 attached to the molding 12, e.g., at mounts 20, as described further below.

In the embodiment shown, the molding 12 is an elongate channel member including an upper surface 24, side edges 26, and a lower recessed surface 28, thereby generally defining a "C" shaped cross-section. It will be appreciated that the molding 12 may have other cross-sectional shapes instead, e.g., generally "D" shaped, "E" shaped, "I" shaped, and the like (not shown). The molding 12 may also include grooves 30 adjacent one or both of the side edges 26 and/or the lower surface 28 for receiving trim 50 therein, as described further below. The upper surface 24 may include a desired finish, e.g., corresponding to the finish of the panels 82, 84, e.g., a painted or deposited finish.

The molding 12 may be a substantially continuous extrusion, e.g., made from metal, such as aluminum or steel, plastic, fiberglass, and/or a composite material (e.g., fiberglass, Kevlar, or other materials embedded in a matrix material, such as a plastic resin). Alternatively, the molding 12 may be formed using a variety of other methods, such as roll-forming, machining, molding, and the like, and/or other materials.

Preferably, the molding 12 is sufficiently rigid to be self-supporting when mounted from only a plurality of discrete locations, i.e., the locations of the mounts 20, 22. The molding 12 may be formed into a shape contoured to conform substantially to a contour of the first and second panels 82, 84. For example, as shown in FIG. 2, the section of molding 12 may include a substantially straight back portion 12a and a curved front portion 12b that correspond substantially to the shape of the panels 82, 84, thereby providing a substantially continuous and/or uniform aesthetic finish.

Mounts 20, 22 are spaced apart from one another between the first and second ends 14, 16 of the molding 12, thereby supporting the molding 12 only at discrete points along its length. In the embodiment shown, each mount 20, 22 has a width less than the width "w" of the ditch 86 such that the mounts 20, 22 may be secured in the ditch 86 to the vehicle 80. Each mount 20, 22 also has a desired height such that, when the mounts 20, 22 are secured in the ditch 86, the molding 12 extends along the ditch 86 without the side edges 26 touching the shoulders 82a, 84a, as explained further below.

As best seen in FIG. 2, a pair of mounts 20, namely feet or pedestals 20, may be provided that extend from the lower surface 28 of the molding 12. In the embodiment shown, a foot 20 may be provided towards each end of the straight portion 12a of the molding 12. Optionally, the feet 20 may be substantially permanently attached to the molding 12, e.g. by spot welding, bonding with an adhesive, and/or using one or more fasteners, e.g., bolts, screws, and the like. Alternatively, the feet 20 may be removable from the molding 12, e.g., using one or more fasteners (not shown). In another embodiment, the feet 20 may be part of a stanchion 72 of the roof rack member 70. For example, as may be seen in FIGS. 3B and 3D, the stanchions 72 may include an extension that may extend through respective holes in the molding 12 to provide the feet 12.

The feet 20 may have substantially flat bottom surfaces such that the feet 20 may lie substantially flat against the bottom of the ditch 86. Optionally, a shim 21 may be provided under one or both feet 20, e.g., to provide a desired height for the molding 12. Alternatively, the feet 20 may have other shapes such that they may seat or otherwise lie against the ditch 86 in a desired orientation, e.g., to support the molding 12 along the ditch 86. For example, the feet 20 may include one or more connectors (not shown) for mating with a bracket (also not shown) secured within the ditch 86.

Figure 4:
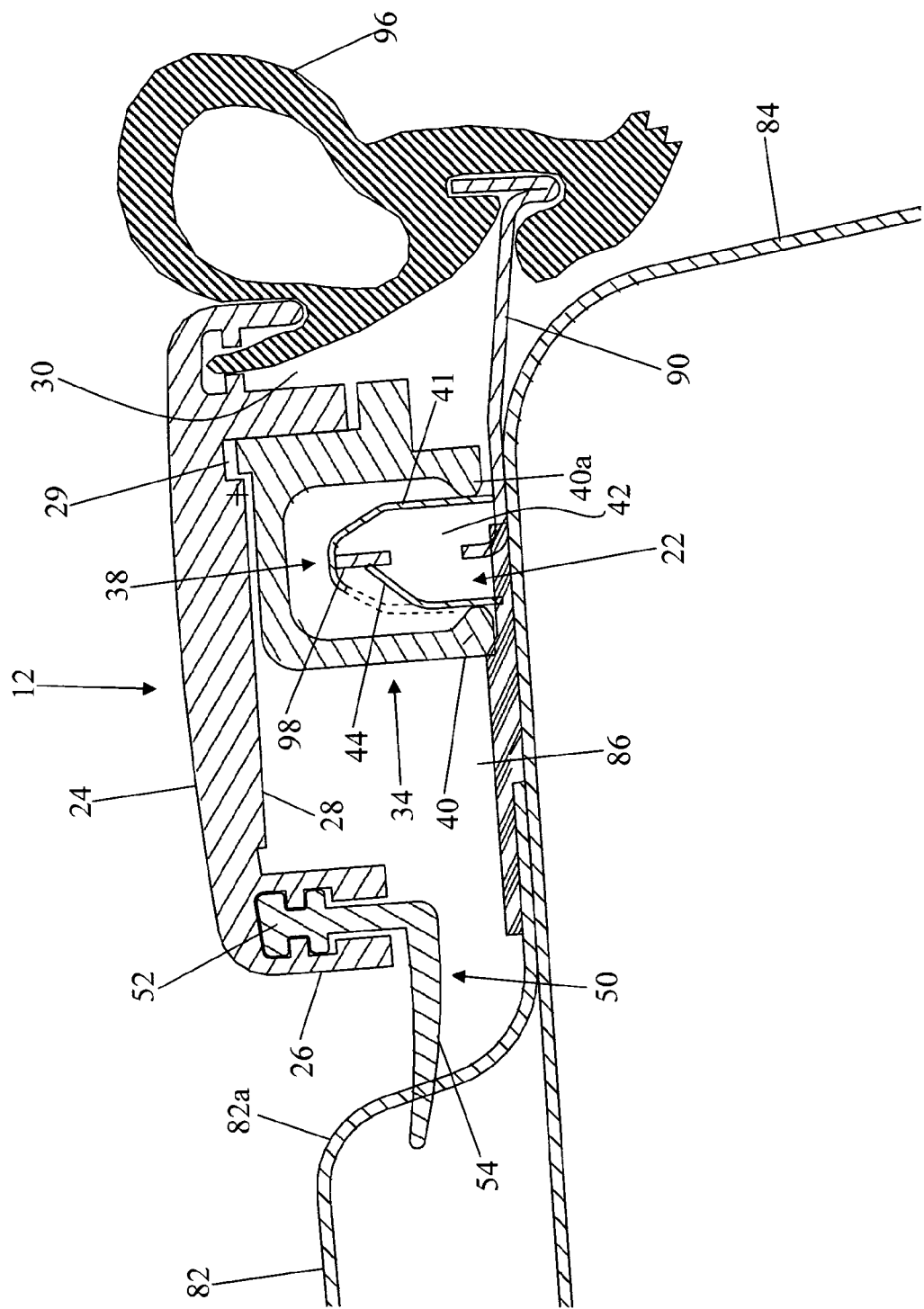
FIG. 4 is a cross-sectional detail of a clip received in a clip adapter to provide a mount for securing molding to a flange extending from a panel.
Figure 5:
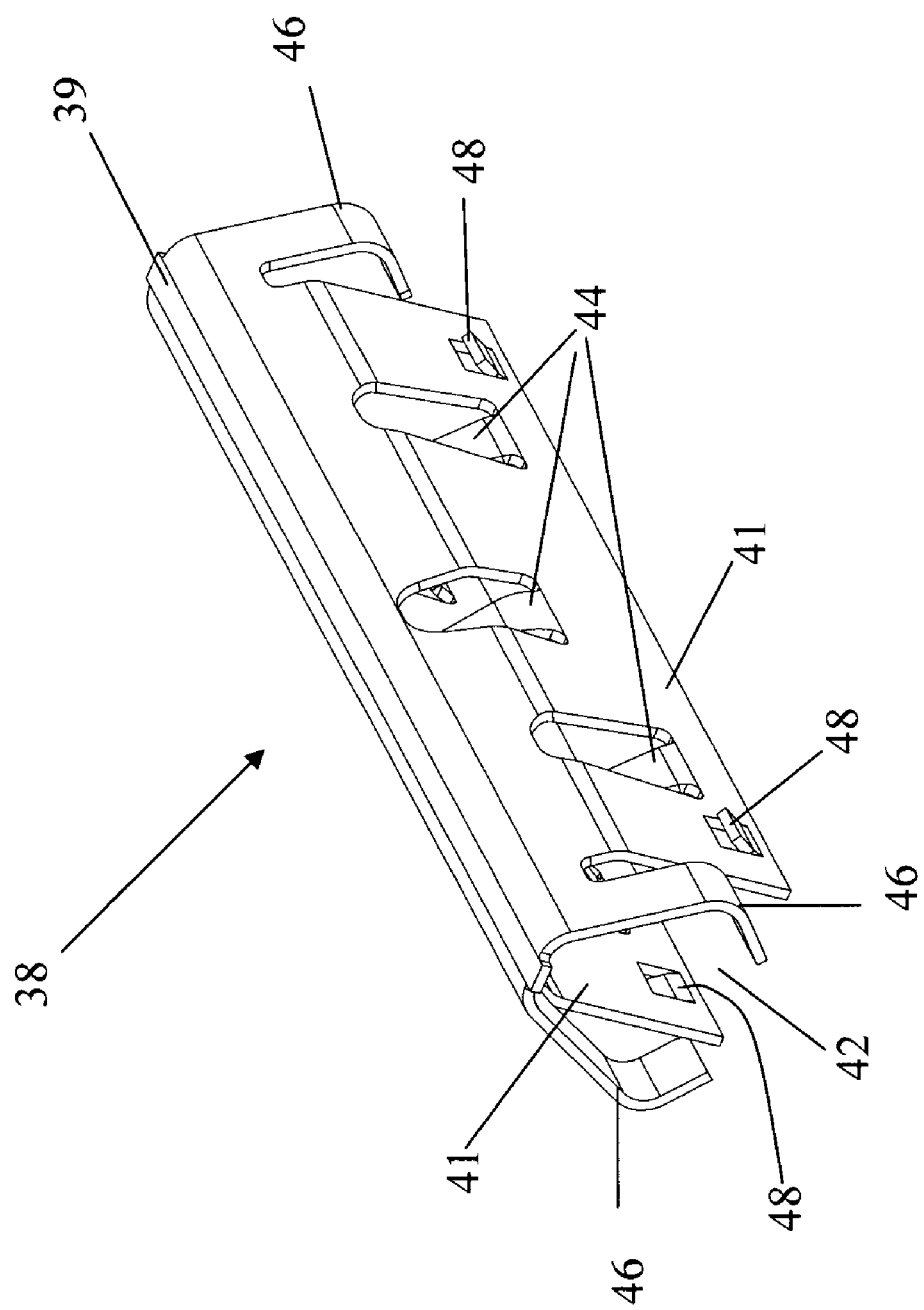
FIG. 5 is a perspective view of an exemplary embodiment of a clip that may be received in the clip adapter of FIGS. 2A and 4.

In addition or alternatively, as shown in FIGS. 3A, 4, and 5, another mount may be provided, such as clip 22 that may be attached to or otherwise extend from the molding 12, e.g., on the curved portion 12b (shown in FIG. 2). Similar to the feet 30, the clip 22 may be substantially permanently or removably attached to the molding 12, e.g., by welding, bonding, and/or using one or more fasteners (not shown). In the embodiment shown, the clip 22 includes a clip adapter 34 and a clip member 38. Alternatively, the clip 22 may be formed as a single member including a slot therein (not shown) for receiving flange 88. Similar to other components of the apparatus 10, the components of the clip 22 may be formed from materials, such as metal, e.g., aluminum or spring steel plastic, and/or composite materials, by extruding, machining, roll-forming, molding, stamping, and the like.

With reference to FIGS. 3A and 4, the clip 22 may include a generally "U" shaped clip adapter 34 including a pocket 36 therein for receiving the clip member 38. As shown, the clip adapter 34 includes legs 40 at least partially defining the pocket 36 and having enlarged ends 40a for capturing the clip member 38 received in the pocket 36, as described further below. In addition, the clip adapter 34 may include one or more tabs or other projections 37 that may be received in a corresponding groove 29 in the molding 12. The clip adapter 34 may be attached to the molding 12, e.g., during manufacturing or shortly before assembling the vehicle 80. For example, the clip adapter 34 may be attached against the lower surface 28 of the molding with the projection 37 received in the corresponding groove 29 in the molding 12, e.g., by welding, bonding, interference fit (e.g., between the projection 37 and the groove 29), and/or using one or more fasteners (not shown).

With particular reference to FIG. 5, the clip member 38 may be a generally "U" shaped body including a base or spine 39 and a pair of opposing sides 41 extending from the base 39 to define a gap or slot 42. The sides 41 may be spaced apart such that the clip member 38 may be received through the ends 40a of the legs 40 into the pocket 36. One or more detents or tabs 44 may extend from the sides 41 into the slot 42, i.e., towards the opposite side 41. For example, each side 41 may include a plurality of detents 44, each of the detents 44 including a free end that extends diagonally into the slot 42 towards the opposite side 41 and the base 39. The space between the detents 44 is sufficiently wide to receive flange 88 therein, as can be seen in FIG. 4.

A pair of wings 46 may extend outwardly and diagonally from the spine 39 beyond the sides 41. The wings 46 may be deformable to provide connectors for securing the clip member 38 to the clip adapter 34, as explained further below. Optionally, the clip member 38 may include one or more tabs 48 extending outwardly from the sides 41, e.g., to provide stops for limiting entry of the clip member 38 into the clip adapter 34, also as explained further below. The clip member 38 may be formed, for example, from sheet metal that is broken into a "U" shape with the detents 44 and/or tabs 48 integrally formed therein. The clip member 38 may be a standard part available for clipping components to a flange of a body panel of a vehicle, such as a "Tinnerman clip" or other device commonly known to those skilled in the art.

With additional reference to FIG. 4, when the clip member 38 is directed into the ditch 86 during installation, such that the flange 88 is received in the slot 42, the free ends of the detents 44 may be deflected away from one another to slide along the flange 88 and accommodate the flange 88 being received in the slot 42. The free end(s) of the detents 44 may be biased to return towards the opposite sides 41 and one another, thereby engaging the flange 88 between the detents 44 to prevent the clip member 38 from being removed.

Once the clip member 38 is attached to the flange 88, the clip adapter 34, which may be attached already to the molding 12 as described above, may be directed over the clip member 38 and forced down such that the clip member 38 passes between the ends 40a of the legs 40 into the pocket 36. As this occurs, the wings 46 may engage the ends 40a of the legs 40 and plastically deform as they enter the pocket 36 to engage the legs 40, thereby securing the clip member 38 in the clip adapter 34. The ends 40a of the legs 40 may abut the stops 48 to limit advancement of the clip adapter 34 over the clip member 38.

Alternatively, the clip adapter 34 may be slid into one end of the clip adapter 34 and into the pocket 36 between the legs 40. The clip member 38 may be secured therein, e.g., by cooperating connectors, spot or continuous welding, bonding with an adhesive, crimping or otherwise deforming a portion of the housing 34, and the like. Optionally, the clip member 38 may include tabs or other elements (not shown) that extend outwardly from the sides 41 that may contact the enlarged ends 40a of legs 40 of the clip adapter 34, thereby preventing the clip member 38 from falling out between the legs 40.

In a further alternative, the distance between the sides 41 of the clip member 38 may be such that the sides 41 are slidably received along the legs 40 above the enlarged ends 40a (not shown) when the clip member 38 is inserted into the pocket 36. Thus, the bottoms of the sides 41 may contact the enlarged ends 40a to prevent the clip member 38 from being removed.

With the clip member 38 received in the clip adapter 34, the clip 22 may then be attached to the molding 12 before installation on the vehicle 80. For example, the clip adapter 34 may be placed against the lower surface 28 of the molding 12 such that the projection 37 is received at least partially in the groove 29. The clip adapter 34 may be attached to the molding 12 by any of the methods described above, e.g., welding, bonding, interference fit (e.g., between the projection 37 and the groove 29), and the like. Alternatively, the clip member 38 may be received in the clip adapter 34 after the clip adapter 34 is attached to the molding 12.

Once the apparatus 10 is assembled, the clip 22 may be directed into the ditch 86 until the flange 88 is received in the slot 42 of the clip member 38. Thus, the clip 22, and consequently, the curved portion 12b (or, optionally, other portion) of the molding 12 may be secured to the flange 88 by friction and/or the bias of the detent(s) 44 against the flange 88. In addition or alternatively, the clip member 38 may be attached to the flange 88, e.g., by welding, bonding, and the like. In a further alternative, the distance between and/or thickness of the sides 41 of the clip member 38 may be adjusted to provide a slot (not shown) that is only slightly larger than a width of the flange 88 such that the flange 88 is frictionally received in the slot 42 without requiring detents 44.

Returning to FIGS. 3A–3D, trim 50 may be attached along at least a portion of the side edges 26 of the molding 12. In one embodiment, the trim 40 has a cross-section, including a base 52 and a flexible flange or flipper 54 extending from the base 52. The base 52 has a cross-section that complements the cross-section of the grooves 30 such that the base 52 may be slidably and/or securely received in the grooves 30. In the embodiment shown, the base 52 and the grooves 30 have corresponding "T" shaped cross-sections. When the base 52 is installed in one of the grooves 30, the flipper 54 extends from the groove 30 and contacts one of the shoulders 82a, 84a, i.e., when the apparatus 10 is mounted in the ditch 86.

As shown, each flipper 54 has a generally "L" shaped cross-section. Alternatively, the base 52 and/or flipper 54 may have other shapes. For example, if grooves (not shown) are provided in the side edges 26 of the molding 12 extending transversely relative to the upper surface 24, the flippers 54 may be substantially straight, angled or curved (not shown) such that they may contact the shoulders 82a, 84a.

The trim 50 may be formed as a continuous length, e.g., by extruding rubber, plastic, or other flexible material, that may be cut into desired lengths corresponding to the portion of the molding 12 along which the trim 50 is secured. To attach the trim 50 to the molding 12, the base 52 may be inserted into the groove 30 from one of the ends 14, 16 of the molding 12 and slid along the groove 30 until the desired length is received along the respective side edge 26 of the molding 12. Optionally, one or more fasteners, adhesives, and the like may be used to secure the trim 50 once installed along the molding 12.

Returning to FIGS. 1–3, a roof rack member 70 may be attached to or otherwise extend from the upper surface of the molding 12. Generally, the roof rack member 70 includes a pair of stanchions 72 and a rail 74 extending between the stanchions 72. The stanchions 72 and rail 74 may be separate components that are attached to one another or may be formed as a single piece. For example, the rail 74 may be formed as a continuous section, e.g., using extrusion, roll-forming, or other continuous feed processes, and cut to a desired length to fit between the stanchions 72. The stanchions 72 may then be connected to ends of the rail 74, e.g., by interference fit, cooperating connectors, fasteners, bonding, welding, and the like. The rail 74 and/or stanchions 72 may be formed from metal, e.g., aluminum or steel, plastic, and/or composite materials, similar to the other components of the apparatus 10.

The rail 74 may include one or more grooves, tracks, and the like (not shown) for receiving an end of a crossbar (not shown) therein. For example, a stanchion or bracket of a crossbar may be fixedly and/or slidably mounted to the rail 74. The bracket (not shown) may be received in a groove or track in the rail 74 and/or clamped around the rail 74. Alternatively, other accessories may be attached to the rail 74 and/or crossbar, e.g., fixed or slidable along the rail 74, as are known to those skilled in the art. In addition to or instead of cross bars, one or more brackets (not shown) may be receivable in a channel in the rail 74, and a rack, strap, and the like may be attached to the bracket for receiving and/or securing an article to the rail 74, such as skis, a bicycle, and the like. Alternatively, the rail 74 may be configured for receiving or otherwise being coupled to a foot of a basket, container, or other carrier device (not shown).

To assemble the apparatus 10, the components, e.g., molding 12, mounts 20, 22, and roof rack member 70, may be manufactured and/or assembled, e.g., using one or more of the materials and methods above. Optionally, one or more of the components may have desired finishes applied to them, e.g., to match and/or complement finishes on the panels 82, 84 or other parts of the vehicle 80. For example, at least the upper surface 24 and possibly the side surfaces 26 of the molding 12 may be painted with a color and style of paint matching the panels 82, 84. In addition or alternatively, plastic, fiberglass, and/or composite components may have pigments and the like impregnated therein to provide a desired color and/or finish.

The mounts 20 may then be attached to the molding 12, e.g., before, after, or simultaneously with the roof rack member 70. In one embodiment, the mounts 20 may be attached directly to the lower surface 28 of the molding 12, e.g., by welding, bonding, using fasteners, and the like. The roof rack member 70 may be similarly attached to the upper surface 24 of the molding 12. As shown in FIG. 2, the stanchions 72 of the roof rack member 70 are attached by bolts 76 that extend through the molding 12.

For example, one or more holes (not shown) may be provided through the molding 12, i.e., between the upper and lower surfaces 24, 28 at each of the locations where the mounts 20 and/or stanchions 72 are to be installed. The holes may be drilled or punched after manufacturing the molding 12 or may be created when the molding 12 is made, as will be appreciated by those skilled in the art. The bolts 76 or other fasteners may be inserted through the holes into the bottom of the stanchions 72. The stanchions 72 may include threaded recesses (not shown) into which the bolts 76 may be screwed. Alternatively, the stanchions 72 may include holes therethrough that may line up with the holes in the molding 12 and the bolts 76. When the bolts 76 are inserted through the molding 12 and the holes in the stanchions 72, mating fasteners, e.g., nuts, washers, and the like, may be threaded onto the bolts 76 and tightened to attach the stanchions 72 to the molding 12.

In another embodiment, a mount 20 and stanchion 72 may be attached to one another through the molding 12. For example, the mount 20 and corresponding stanchion 72 may be abutted against or otherwise positioned adjacent the lower and upper surfaces 28, 24, respectively, and a bolt or other fastener (not shown) may be inserted through the mount 20, the hole in the molding 12, and into the stanchion 72. The stanchion 72 may include a recess or hole having threads for slidably engaging mating threads on the fastener received therein. Thus, the fastener may simply be screwed into the threaded recess until the mount 20 and stanchion 72 are secured against the molding 12. Alternatively, the stanchion 72 may included a hole that extends entirely through the stanchion 72 such that a fastener may extend from the molding 21 through the hole in the stanchion 72 and a mating fastener may be connected to the fastener. The mating fastener may be received in a recess into which the end of the fastener is extended, thereby substantially concealing the fasteners, which may improve the aesthetic appearance of the installed roof rack member 70. It will be appreciated that the fastener described herein may also be inserted in the opposite direction, i.e., from the stanchion 72, through the hole in the molding 12, and into the mount 20.

In another embodiment, at least one of the mount 20 and the stanchion 72 may include an extension (not shown) that may extend through the hole in the molding 12. For example, the extension and the hole may have complementary shapes such that the extension and hole are keyed with one another. Once the extension is directed through the hole in the molding 12, the other of the mount 20 and the stanchion 72 may be attached to the extension, e.g., by welding, bonding, using one or more fasteners, and the like. In yet another alternative, the mount 20 may be an extension of the stanchion 72 that may extend through the hole in the molding 12.

In addition, if a clip 22 is provided, the clip adapter 34 may be attached to the lower surface 28 of the molding 12, as described above, and the clip member 38 may be received in the clip adapter 34. The clip adapter 34 may be attached to the molding 12, e.g., as described above, either before or after the clip member 38 is received therein. In addition, the trim 50 may be attached to the molding 12 at any time, as described above.

Once the apparatus 10 is assembled, it may be installed to cover a seam extending between first and second panels of a vehicle 80. Generally, the vehicle 80 may include one or more roof and side panels 82, 84 at least partially defining a ditch 86 between shoulders 82a, 84a, as shown in FIGS.

3C and 3D. In addition, a portion of the ditch 86 may extend between shoulder 82a of the roof panel 82 and a "T" flange or other trim panel 90, as shown in FIGS. 3A and 3B. Optionally, the ditch 86 may also be at least partially defined by one or more additional panels of the vehicle 80.

For example, as best seen in FIGS. 1 and 3, the vehicle 80 may include a roof panel 82 that extends between a windshield area 93 and a rear window area 94 of the vehicle 80. The trim panel 90 may extend along a portion of the vehicle 80, e.g., from the windshield area 93 along one or more door openings 92, e.g., the two door openings 92 shown in FIG. 1. The trim panel 90 may include a flange 88 that extends upwardly from the trim panel 90, as shown in FIG. 3A. A side panel 94 may then extend from the (second) door opening 92 to the rear window area 94.

The mounts 20, 22 may be secured to one or both of the panels 82, 84 within the ditch 86 such that the molding 12 extends along the ditch 86 without touching the shoulders 82a, 84a, as best seen in FIGS. 3C and 3D. Preferably, the height of the mounts 20, 22 is such that the upper surface 24 of the molding 12 is disposed between and generally even with the shoulders 82a, 84a. Thus, the molding 12 extends freely along the ditch 86 between the shoulders 82a, 84a.

The feet 20 may be attached directly to the panels 82, 84 defining the ditch 86. For example, the feet 20 may be attached by welding, bonding with an adhesive, using one or more fasteners, and the like. Alternatively, a bracket (not shown) may be mounted in the ditch using one or more of these methods, and connectors on the feet 20 may interlock with connectors on the bracket to secure the feet 20 within the ditch 86. In a further alternative, one or more fasteners (not shown) may be inserted through the feet 20 and into the panel(s) of the vehicle 80. The panel(s) and/or other structures of the vehicle 80 may include stud-outs or other complementary features (not shown) for receiving bolts or other fasteners connecting the feet 20 to the vehicle 80.

Turning to FIGS. 3A and 4, the clip 22 may be attached to the flange 88 extending from the ditch 86, e.g., using the clip member 38 and/or detents 44 described above. For example, the clip member 38 may be attached to the flange 88, thereby retaining the molding 12 along the door opening(s) 92. When the door(s) (not shown) of the vehicle 80 is(are) closed, the door(s) may further define the ditch 86 along the door openings 92.

Because the molding 12 is self-supporting between the mounts 20, 22, the molding 12 may remain in a substantially smooth line along the ditch 86. This may provide a more aesthetically pleasing finish to the vehicle 80, since there will be no substantial irregularities in the contour of the molding 12, as may occur when a strip of molding is applied directly within a ditch between two panels.

In addition, if the molding 12 includes trim 54, when the apparatus 10 is mounted in the ditch 86, the flippers 54 of the trim 50 may extend from the molding 12 to contact the shoulders 82a, 84a. Because of the flexibility of the trim 50, the molding 12 may remain true while the trim 50 may accommodate any variations that may occur along the length of the ditch 86. Further, the trim 50 may at least partially seal the ditch 86 from exterior elements, e.g., to prevent water that may land on the panels 82, 84 from passing under the molding 12. Thus, the apparatus 10 may direct rain or other water along the ditch 86 and away, and prevent the water from pooling in the ditch 86, which may be undesirable.

Generally, the door(s) of the vehicle 80 may include flexible molding, e.g., "bulb seal" 96 for sealing the door opening(s) 92. When the door(s) is(are) closed, the molding 96 may also substantially engage the side edge 26 of the molding 12 and/or the trim panel 90, as shown in FIG. 4, thereby further sealing the ditch 86.

In addition, if desired, one or more components may be carried within the ditch 86, e.g., between the mounts 20, 22. For example, if needed, electrical wiring (not shown) may be run along a portion of the ditch 86. The molding 12 and trim 50 may substantially seal the ditch 86, thereby protecting the wiring therein.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling the spirit and scope of the appended claims.

What is claimed is:

1. An apparatus for covering a seam extending between first and second panels of a vehicle, the first and second panels comprising opposing shoulders adjacent the seam at least partially defining a ditch having a width and a height, comprising:
   an elongate section of molding comprising first and second ends, an upper surface comprising a desired aesthetic finish for the vehicle, and a lower surface; and
   a plurality of mounts extending from the lower surface and spaced apart from one another between the first and second ends of the molding, each mount comprising a width less than the width of the ditch such that the mount may be secured in the ditch to the vehicle, each mount comprising a height such that, when the mounts are secured in the ditch, the molding extends along the ditch without touching the shoulders.

2. The apparatus of claim 1, further comprising flexible trim extending along at least one side edge of the molding at least partially between the first and second ends, the flexible trim contacting at least one of the shoulders when the mounts are mounted in the ditch.

3. The apparatus of claim 1, wherein the molding comprises a substantially rigid member having a shape between the first and second ends contoured to conform substantially to a contour of the first and second panels.

4. The apparatus of claim 1, further comprising a roof rack member extending from the upper surface of the molding.

5. The apparatus of claim 4, wherein the roof rack member is mounted to the molding opposite the mounts.

6. The apparatus of claim 4, wherein the roof rack member is mounted to the molding at the mounts.

7. The apparatus of claim 1, wherein the desired finish comprises paint.

8. The apparatus of claim 1, wherein at least one of the first and second panels comprises a flange extending along at least a portion of the ditch, and at least one of the plurality of mounts comprises a clip for engaging the flange.

9. An apparatus for covering a seam extending between first and second panels of a vehicle, the first and second panels comprising opposing shoulders at least partially defining a ditch having a width and a height, comprising:
   an elongate substantially rigid section of molding comprising first and second ends defining a longitudinal axis therebetween, an upper surface, arid a lower surface;
   a plurality of mounts extending from the lower surface and spaced apart from one another between the first and second ends of the molding, each mount comprising a width less than the width of the ditch such that the mount may be mounted in the ditch to the vehicle, each mount comprising a height such that, when the mounts are mounted in the ditch, the molding extends along the ditch without touching the shoulders; and a roof rack member extending from the upper surface of the molding, and attached to the molding adjacent the plurality of mounts.

10. The apparatus of claim 9, wherein the roof rack member comprises a plurality of stanchions for attaching the roof rack member to the molding, and wherein the plurality of mounts comprise extensions of the plurality of stanchions extending through the molding.

11. The apparatus of claim 1, wherein the plurality of mounts comprise feet extending from the lower surface of the molding.

12. The apparatus of claim 11, wherein a foot is provided towards each end of a straight portion of the molding.

13. The apparatus of claim 11, further comprising one or more shims configured to be positioned between one or more of the feet and a bottom of the ditch.

14. An apparatus for covering a seam within a roof ditch extending between a roof panel and at least one side panel of a vehicle, comprising:

an elongate substantially rigid section of molding comprising first and second ends defining a longitudinal axis therebetween, and at least two openings extending between upper and lower surfaces thereof; and a roof rack member comprising at least two stanchions attached to the molding and a rail extending between the stanchions, each stanchion comprising an extension extending through the openings to provide a foot for attaching the molding assembly to the roof ditch of a vehicle.

15. The molding assembly of claim 14, further comprising a clip on the molding for interlocking with a flange extending from the roof ditch of a vehicle for further securing the molding to the roof ditch.

16. The molding assembly of claim 14, further comprising trim extending along at least a portion of one side edge of the molding.

17. The molding assembly of claim 16, the trim comprising a flexible flipper extending from the one side edge for contacting a shoulder of the roof ditch.

18. The molding assembly of claim 14, further comprising trim extending from both side edges of the molding.

19. The molding assembly of claim 18, the trim comprising a flexible flipper extending from each side edge for contacting a respective shoulder of the roof ditch.

20. The molding assembly of claim 14, the molding comprising a metal extrusion.

21. The molding assembly of claim 20, wherein the molding comprises aluminum.

22. The molding assembly of claim 14, wherein the molding comprises a coating of paint on at least the upper surface thereof.

* * * * *